C. GITZENDANNER.
SIGNATURE GATHERING OR INSETTING MACHINE.
APPLICATION FILED SEPT. 25, 1911.
1,203,109.
Patented Oct. 31, 1916.
5 SHEETS—SHEET 1.
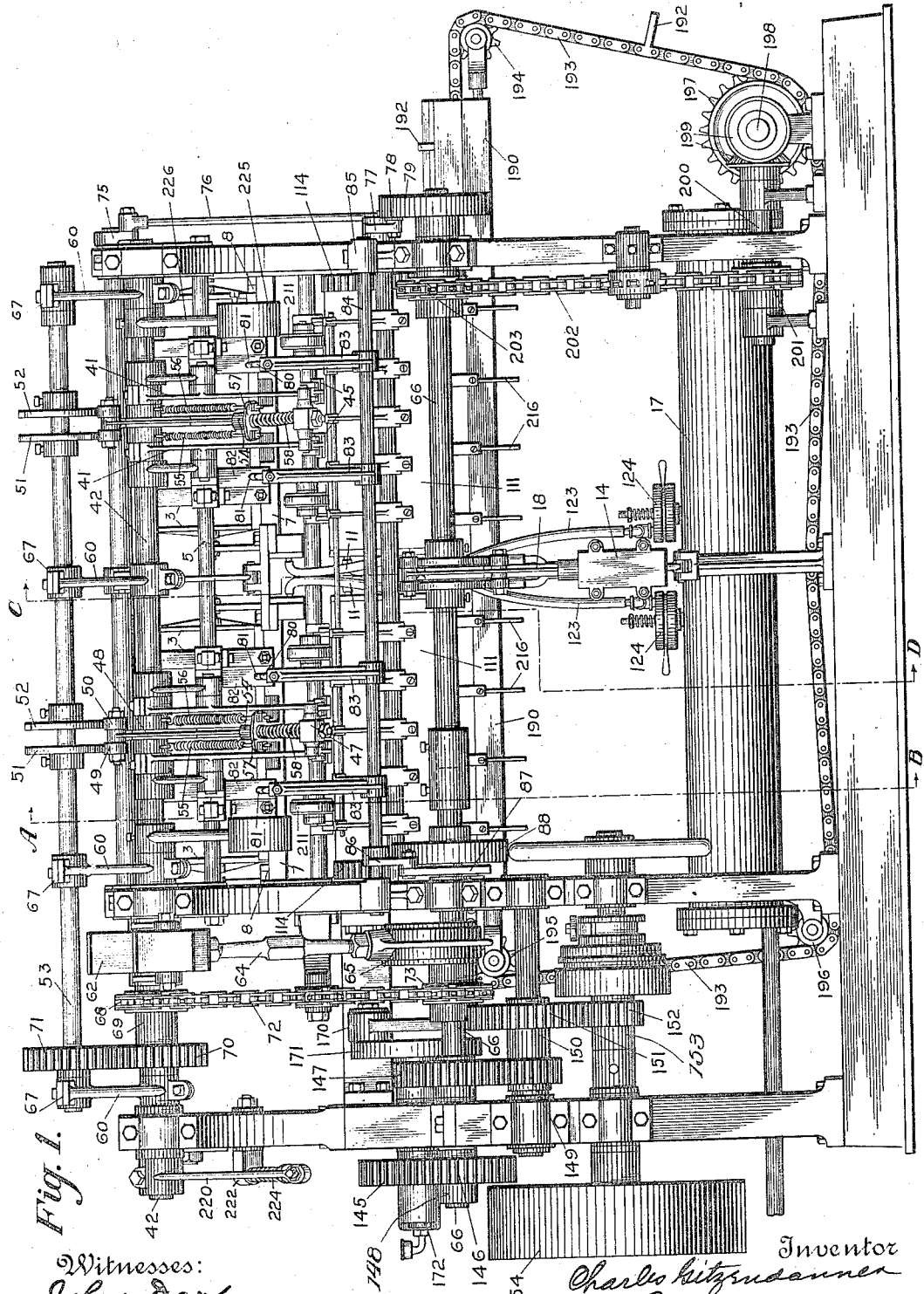

C. GITZENDANNER.
SIGNATURE GATHERING OR INSETTING MACHINE.
APPLICATION FILED SEPT. 25, 1911.
1,203,109.
Patented Oct. 31, 1916.
5 SHEETS—SHEET 2.
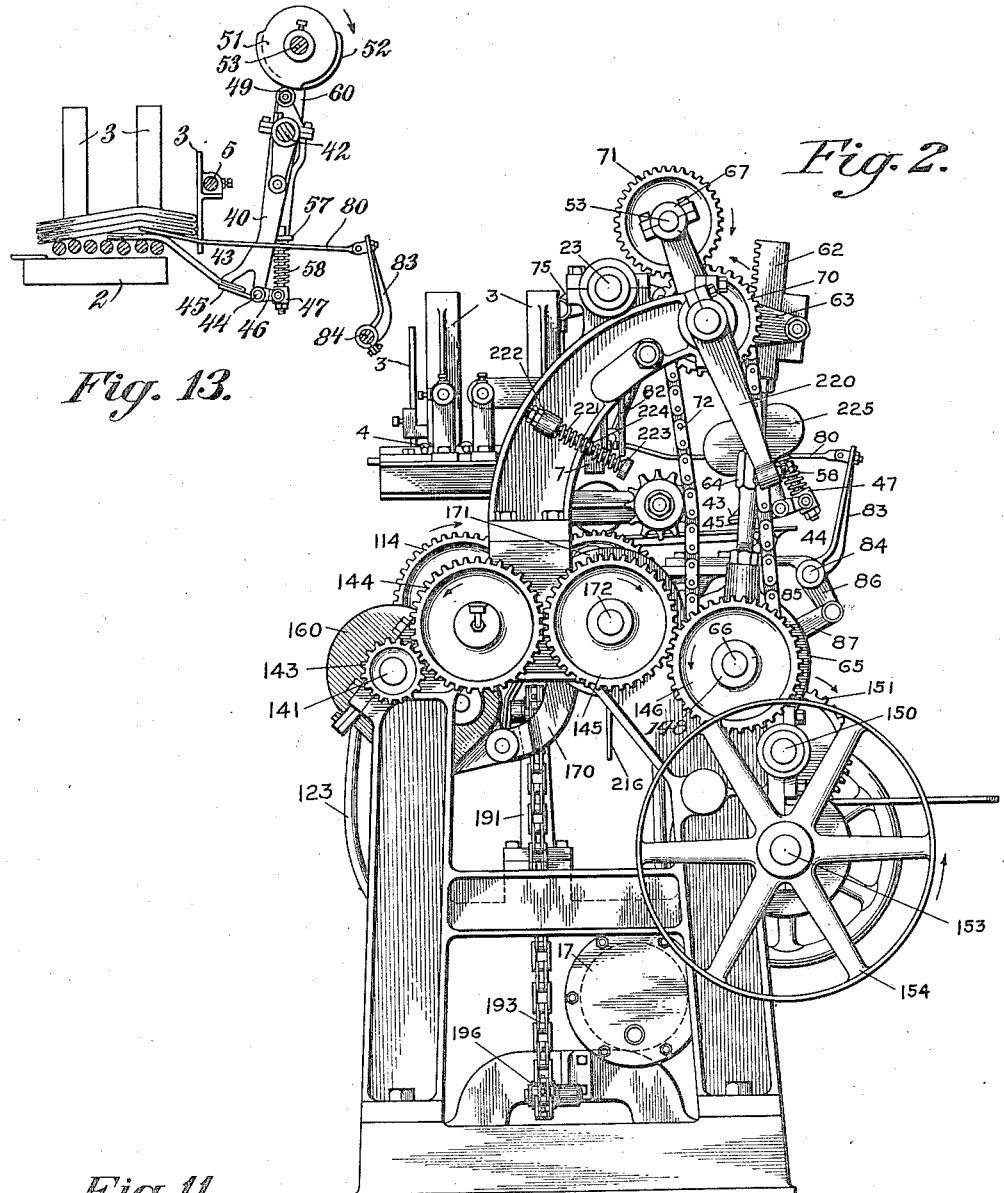
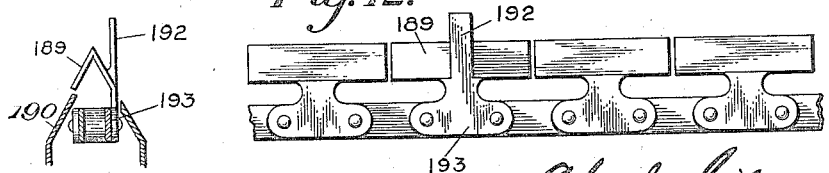

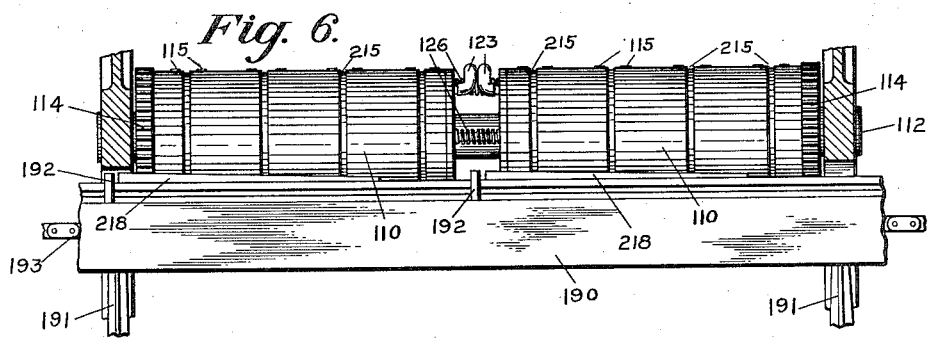

UNITED STATES PATENT OFFICE.

CHARLES GITZENDANNER, OF NEW YORK, N. Y., ASSIGNOR, BY DIRECT AND MESNE ASSIGNMENTS, TO KAST INSETTING AND GATHERING MACHINE COMPANY, A CORPORATION OF DELAWARE.

SIGNATURE GATHERING OR INSETTING MACHINE.

1,203,109.     Specification of Letters Patent.     Patented Oct. 31, 1916.

Application filed September 25, 1911. Serial No. 651,048.

*To all whom it may concern:*

Be it known that I, CHARLES GITZENDANNER, a citizen of the United States, and a resident of New York city, in the county of New York and State of New York, have invented new and useful Improvements in Signature Gathering or Insetting Machines, of which the following is a specification.

The invention relates to signature gathering or insetting machines for assembling folded signatures one inset within another, and more particularly to machines wherein previously folded signatures are opened by a series of opening mechanisms, the opened signatures being progressed from one mechanism to another, an opened signature being added by each mechanism to the signatures upon the conveying means whereby the book or pamphlet is built up with the signatures inset one within another, although certain features of the invention may be applicable to other kinds of machines.

The objects and advantages of the invention are set forth hereinafter or will be obvious to those skilled in the art herefrom, and the novel constructions by which such objects and advantages are attained are pointed out in the accompanying claims.

The invention consists in the novel parts, constructions, arrangements, combinations and improvements herein shown and described.

The accompanying drawings, referred to herein and forming a part hereof, illustrate one embodiment of the invention, the same serving in connection with the description herein to explain the principles of the invention.

Figure 3:
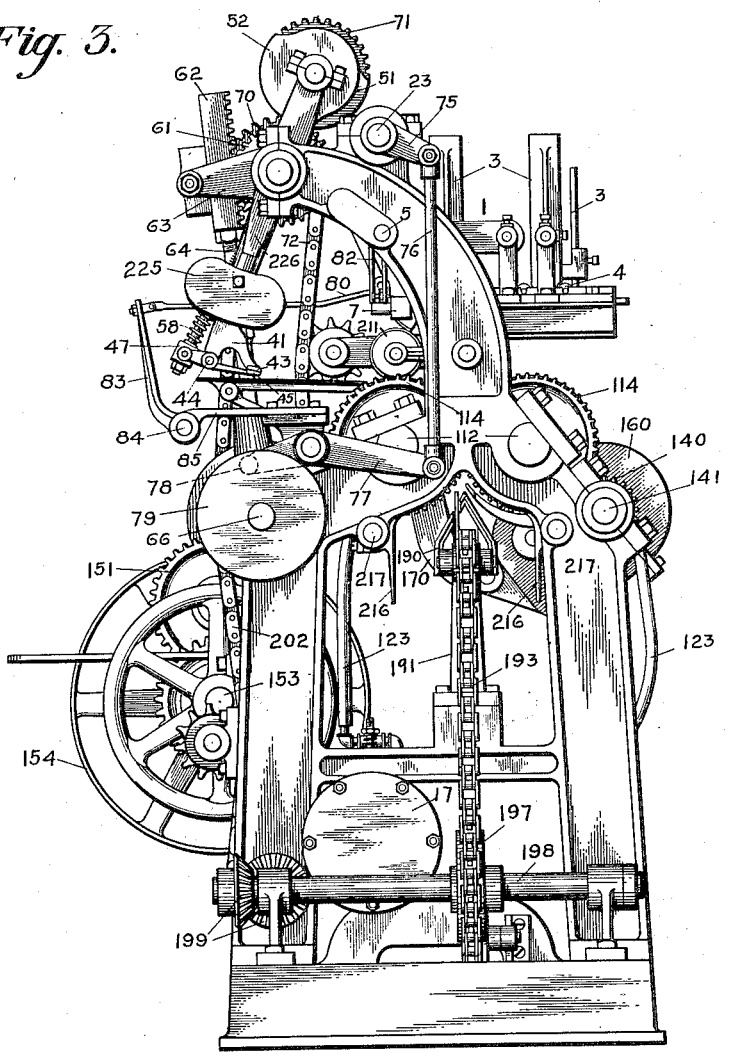
Figure 5:
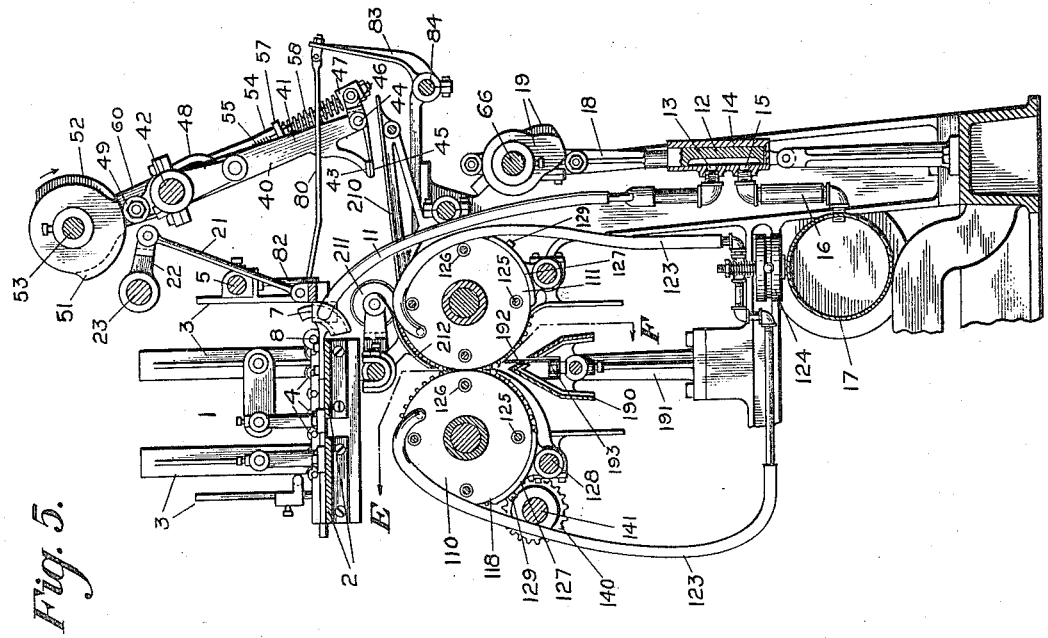
Figure 4:
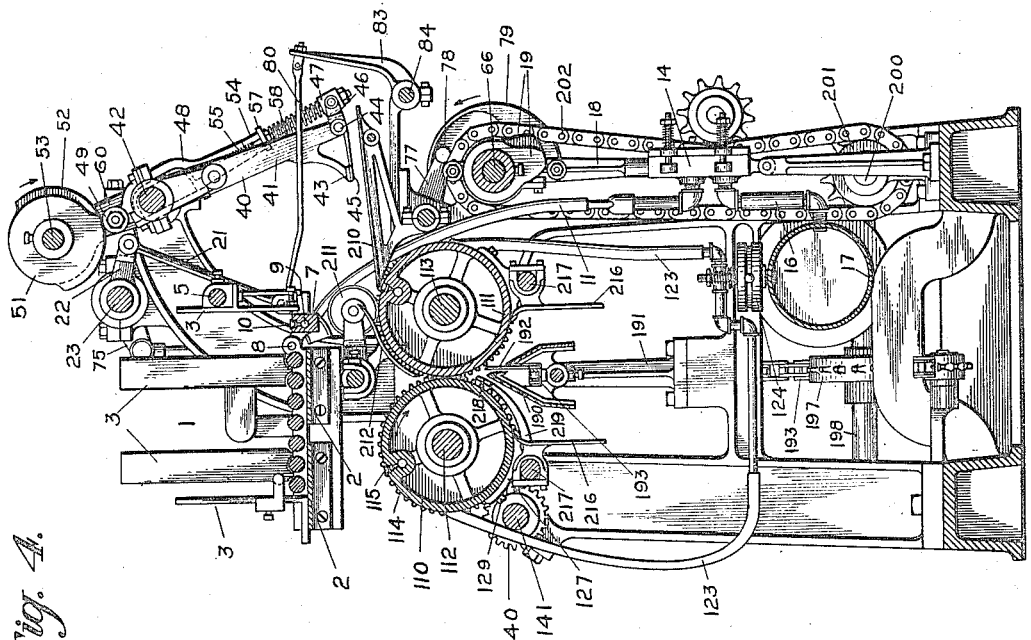

Of the drawings: Figure 1 is an elevation of a machine constructed in accordance with the principles of the invention; Fig. 2 is an elevation looking at Fig. 1 from the left; Fig. 3 is an elevation looking at Fig. 1 from the right; Fig. 4 is a transverse vertical section on the line A—B of Fig. 1; Fig. 5 is a transverse vertical section on the line C—D of Fig. 1; Fig. 6 is a fragmentary elevation of the conveying means, and of one of each pair of the signature opening cylinders and the devices for registering an opened signature on the conveyer with those previously thereon; it may be regarded as substantially a fragmentary section on the line E—F of Fig. 5; Fig. 7 is a detail elevation of the disk or head at the end of the signature opening cylinders; it corresponds to an elevation looking at the full device of Fig. 8 from the left; Fig. 8 is a transverse section on the line G—H of Fig. 7, looking in the direction of the arrows; Fig. 9 is a detail elevation, with one end of the casing removed of the speed-varying device for the signature-opening cylinders; Fig. 10 is a detail view on the line I—K of Fig. 9; Figs. 11 and 12 are details of the saddle, and Fig. 13 is a detail view showing the lowermost signature being withdrawn and the other signatures in the hopper being supported at the time of such withdrawal.

Referring to the accompanying drawings, illustrating by way of example one embodiment of the invention, the embodied form of means of supply of folded signatures will be first described. There is provided a plurality of mechanisms for opening signatures arranged in a series with respect to the conveying mechanism whereby a signature opened by one mechanism of the series is conveyed past another opening mechanism and a signature opened by the latter device is inset with said conveyed signature, similarly to the machine shown in my previous application for patent Serial No. 557,430.

In the accompanying drawings, for the sake of simplicity, but two sets of signature opening mechanisms are shown in the series, but it will be obvious that a larger number of such mechanisms may be used and the series can be increased to build up a book or pamphlet of any desired practical size. But one series of signature opening devices, and its attendant mechanisms will be described, which will be sufficient for an understanding of the entire machine.

In the embodied form of signature holding device, the signatures are withdrawn one by one from the bottom of a stack of such signatures, and presented with the open edge foremost to the signature opening devices; also in such embodied form the signature is engaged by its back edge to be withdrawn from the stack and while it is being fed to, and until it is engaged by, the opening devices. Said holder 1 for a stack of signatures is shown with a bottom plate or plates 2, and with suitable uprights 3 adjustable for signatures of different sizes. On the sides and back of the holder, the uprights 3 are adjustably mounted on the frame of the holder. At the front, where the signature-separating and withdrawing devices operate, the standards 3 are hung from a rod 5.

Within the holder 1 are a series of rollers 4, upon which the stack of signatures rest, and which facilitate the easy withdrawal of the bottom signature. At what may be termed the front end of the signature holder 1, that is the end at which the signatures are withdrawn, there is a gap between the last roller 4 and the uprights 3, as will appear best from Fig. 4 of the drawings. At this point is located a downwardly swinging suction device for bending down the back edge of the bottom signature preparatory to its being taken by the withdrawing grippers. The suction device comprises a bar 7 pivoted at each end 8 thereof to the holder 1. The bar 7 has an opening 9 running therethrough communicating with a series of suction orifices 10 located so as to contact with the back edge of the bottom signature. The opening 9 communicates at one end with a conduit 11 which communicates through orifice 13 with a casing 14 about a slide valve 12. A second orifice 15 opens also into the valve casing 14 and by means of pipe 16 communicates with suction tank 17. The slide valve 12 is actuated by cam 19 on shaft 66 by means of the valve rod 18. The slide valve 12 is moved to cause suction in the orifices 10 before the downward movement of the bar 7 begins so that the bar will bring the bottom signature down with it, the suction being cut off as the back edge of the bent-down signature is gripped by the withdrawing grippers (to be later described) to withdraw it from the bottom of the stack. The bar 7 receives its swinging movement through the connecting rod 21 pivoted thereto and to an arm 22 upon the shaft 23. The shaft 23 is rocked by means of an arm 75 fixed to said shaft, said arm being also pivoted to a link 76. The other end of said link is pivotally connected to lever 77 the other end of which carries a cam roll 78 operated by a groove cam 79 on shaft 66.

The bent-down signature is withdrawn, in the embodied form of the invention, by means of a swinging gripper device 40. This gripper device also pushes the signature forward into engagement with the opening cylinders. Said device comprises two arms 41 fixed upon rock shaft 42, and spaced apart from each other. The gripper jaws 43 are shown fixed and integral with the arm 41. Pivoted at 44 in the end of each arm 41 are the movable jaws 45, said jaws also extending backwardly from the pivot point 44 to form lever arms 46. Journaled in the ends of these lever arms 46 is a cross piece 47. A rod 48 passes through an orifice in the cross piece 47, and at its upper end said rod is yoked or straddled about the rock shaft 42. Said rod 48 at its upper end carries two cam rolls 49 and 50. These cam rolls coöperate respectively with cams 51 and 52 on the shaft 53. These cams control the closing of the grippers to seize the bent-down signature and the opening of the grippers to release the signature after the latter has been pushed forward and is in engagement with the opening device. By adjusting one cam angularly with respect to the other, the times of opening and closing the gripper may be accurately regulated. A shoulder 54 is formed on the rod or link 48 against which bears a cross piece 57, to which are connected two springs 55 and 56, said springs being suspended from the bearings of the arms 41. These springs serve to hold the cam rolls 49 and 50 to their cams and also tend to open the grippers when allowed to by the cams. A cushioning spring 58 acts between the cross piece 57 and the part 47 to prevent slamming of the grippers as they open and close and to accommodate the bite of the grippers to signatures of different thicknesses.

The shaft 53 is carried by arms 60 rigidly fixed to shaft 42. Fixed to the shaft 42 is a pinion 61 with which meshes a rack bar 62 reciprocable in a guiding bracket 63 upon the machine frame. Said rack is connected by a link 64 to an eccentric 65 on shaft 66. This mechanism gives its oscillatory motion to the shaft 42 and to the gripper devices 40 whereby they swing to and from the signature stack. The shaft 53 swings about the shaft 42 in harmony with the swinging movement of the gripper devices to keep the opening and closing cams in operative position relative to the cam rolls 49 and 50, by reason of arms 60 being fixed to shaft 42. The shaft 53 also rotates in its bearings 67 upon the arms 60, to secure relative movement between the cams 51 and 52 and the cam rolls 49 and 50, so that the cams may act through the intervening mechanism to open and close the grippers. To secure this movement, in the embodied form, a sprocket wheel 68 is fixed to a sleeve 69 upon the shaft 42, said sleeve being of course rotatable on the shaft. Fixed to the sleeve 69 is also a pinion 70. In mesh with the pinion 70 is a pinion 71 on shaft 53. A sprocket chain 72 passes over sprocket wheel 68 and over a sprocket wheel 73 fixed on the shaft 66. It will thus be seen that the shaft 53 is rotatably driven from the shaft 66, the pinions 70 and 71 rolling on each other during the rocking of the shaft 53 about the shaft 42.

Means are provided for easing or lifting the stack of signatures to facilitate the withdrawal of the lowermost signature. As embodied, said means comprises lifting fingers or rods 80 which enter beneath the stack of signatures after the lowermost signature is bent downwardly and which lift or ease the stack of signatures whereby the lowermost signature slips easily out. The fingers 80 slide in apertures 81 in supports 82, respectively, carried by the shafts 5, (Figs. 1, 3, 4 and 5). The fingers 80 are pivoted to arms 83 fixed to shaft 84 supported in brackets 85 mounted upon the machine frame. The shaft 84 is rocked by means of an arm 86 (Fig. 2) fixed to said shaft, and to which arm is pivoted a yoked rod 87 passing about the shaft 66, and actuated by cam 88. (Fig. 1).

The embodied form of signature-opening means comprises two cylinders, or equivalent devices, arranged side by side, and having the suction devices for engaging the opposite sides of the signature at or near the front or open edge whereby the two halves of the signature are opened apart, the suction then being stopped and the signature delivered or dropped to the conveying means. The general form of these devices may be similar to that shown in my said pending application Serial No. 557,430. Two opposed cylinders 110 and 111 are provided mounted loosely upon shafts 112 and 113, respectively. Each cylinder is shown provided with a gear wheel 114 bolted to the cylinder (see Fig. 8) for rotating it upon its shaft.

A series of suction orifices 115 are arranged along the cylinder (Figs. 4, 6 and 8) through which the suction acts to attach the side of the signature near its front or open edge to the cylinder. The orifices 115 connect with a passage 116 within the cylinder which passage terminates in an arcuate groove 117 concentric with the cylinder shaft, and shown in cross-section in Fig. 8 and in dotted line in Fig. 7. Fitting closely against the head of the cylinder is a circular plate 118 mounted loose upon the shaft 112 and shown also shouldered over the bushing 119 upon which the cylinder 110 is mounted. A bushing 120 is shown at the other end of the cylinder upon the shaft 112. These bushings may be loose on the shaft and the cylinder loose on the bushing in order to give free movement and to avoid heating.

The plate 118 is stationary, the cylinder rotating with its head in contact with said plate. There is an aperture 121 through said plate 118 communicating on the outside with the atmosphere. There is another aperture 122 in said plate which communicates through the conduit 123 with the suction tank 17. The conduits 123 from each of the opposed cylinders pass through a valve 124 by which the supply of air may be cut off when the cylinders are not in use or the suction may be regulated as desired.

Means are provided for holding the plate 118 firmly to its cylinder head to make an air tight joint, and in the embodied form the two consecutive sets or pairs of cylinders in the series are placed with their similar ends toward each other (see Figs. 6 and 8). Rods 125 extend from one of said heads toward the other as supports for springs 126 which press against both of said heads to hold them in position. The heads 118 are each secured, respectively, to a bracket 127 carried upon a rod 128. A clamping screw 129 passes through a slot in the bracket 127 and is threaded into one of a series of holes in the rim of the disk 118. The disk may thus be adjusted angularly to vary the timing of the suction devices to accommodate the machine to signatures of different sizes. It will be understood that when suction is caused through the conduit 123 that there will be suction through the orifices 115 as long as the groove 117 is in register with the opening 122. When said groove 117 passes into register with the opening 121, atmospheric equilibrium is restored, and the suction at the orifices 115 ceases.

Means are provided whereby the speed of the signature-opening cylinders, or equivalent devices, may be varied and regulated to handle the signatures in the best possible manner. It is usually found advisable to slow down the cylinders, or equivalent devices, as they take the edges of the signature at the beginning of the opening movement, and to speed them up just as the signature is about to be let go. In the embodied form of such signature moving and controlling means (Figs. 2, 4, 9 and 10), pinions 140 mesh with the gears 114. Said pinions 140 are fixed on shaft 141. On shaft 141 is a sleeve 142 and fast on said sleeve a pinion 143. The connections between said shaft 141 and sleeve 142 will be later described as it comprises the speed differential. Said pinion meshes with a gear 144 and this in turn with a gear 145, and said gear 145 meshes with a gear 146 on shaft 148. A gear 147 on the shaft 148 meshes with a pinion 149 on shaft 150. A gear 151 on said shaft meshes with a pinion 152 on shaft 153 carrying the driving pulley 154.

Loosely sleeved on the shaft 141 and the sleeve 142 is a casing 160 (Figs. 9 and 10.) Within said casing is a gear wheel 161 fixed to the shaft 141 and a gear wheel 162 fixed on the sleeve 142. Mounted in the casing 160 is a shaft 163 and also a shaft 164. Loose on the shaft 163 is a wide pinion 165 meshing with the gear 161 of the shaft 141. Loose on the shaft 164 is a wide pinion 166 meshing with the gear wheel 162. The pinions 165 and 166 also mesh with each other, as will appear from Figs. 9 and 10. Means are provided for swinging the casing 160 to and fro on the shaft 141 and sleeve 142, in the direction of rotation of the shaft and sleeve to slow down the rotation of the driven shaft 141 relatively to the driving gear 162, and in the opposite direction therefrom to speed up the driven shaft 141 relatively to the driving gear 162. The embodied form of swinging means for the casing comprises a link or connecting rod 170 pivoted to the crank disk 171 carried on the shaft 172.

The embodied form of means for conveying the opened signatures along past the series of opening mechanisms, whereby the opened signatures from the successive signature opening mechanisms are brought together, one inset within another, comprises a substantially horizontal saddle 190 mounted upon supports 191 upon the machine frame. Said saddle extends along centrally of and below the centers of the respective pairs of signature opening cylinders, whereby the opened signatures when released from the cylinders will fall upon the saddle with the back edge upward. When the registering device hereinafter described is used, the signature will first fall upon that, as explained in connection therewith. It will be seen further that when a signature falls, if one or more signatures are beneath it upon the saddle they will be inset within it. The saddle 190 is slotted at one side of its apex. Through said slot projects pins 192 attached to sprocket chain 193 when they are on the upper reach of the sprocket chain. Means are also provided, by one feature of the invention, for preventing the bending or crumpling of the edge of the first signature by the pin 192 by reason of a single signature bending at its edge, whereby it will be out of register with the other signatures when inset therewith. To prevent this, I have in the embodied form made the crown or apex 189 of the saddle separate from the remainder thereof and just a trifle higher (see Figs. 11 and 12) than the sides. Said crown 189 is also in sections, each section being attached to a link of the sprocket chain. The crown therefore travels with the chain and being higher than the remainder of the saddle supports the signature so that there is practically no friction between the signature and the other parts of the saddle. When the pin 192 contacts with the edge of the signature as it hangs on the bar 218 (later described, also see Fig. 6) the front end of the signature as it slides down onto the saddle contacts with the crown moving at the same speed, and all tendency to bend its edge is avoided. Said sprocket chain 193 extends along within the saddle 190 and passes over sprocket bearing wheels 194, 195 and 196 and about a driving sprocket 197. The sprocket wheel 197 is fixed on shaft 198 which is driven by miter gears 199. One of said gears 199 is fixed on shaft 200, to which shaft is also fixed sprocket wheel 201. Over this runs sprocket chain 202, said chain running also over sprocket wheels 203 on shaft 66.

The embodied form of means for directing the signature, after it is withdrawn from the stack and is held by the grippers, into the signature-opening mechanism, comprises a table 210 shown clearly in Figs. 4 and 5. Said table terminates close to the top of the cylinder 111 so that the signature will slide easily onto the surface of the cylinder. A series of presser rolls 211 press upon the surface of the cylinder, the signature passing between the rolls and the cylinder. A series of guiding fingers 212 are also provided for directing the signature downwardly between the opposed cylinders 110 and 111. For the purpose of stripping the opened signatures off the cylinders, or rather to insure that an opened signature will not stick to a cylinder, each cylinder is provided with peripheral grooves 215 into which grooves extend fingers 216 supported, respectively, on rods 217.

Means are provided for insuring the registry of the successively dropped signatures, whereby they will be in register with each other upon the conveying means. In the embodied form thereof there is located centrally of each pair of the opening cylinders, and slightly below the central line of the cylinders, or equivalent devices, a supporting bar 218. This bar 218 is supported by an arm 219 from the shaft 217. This bar is arranged horizontally and longitudinally of the direction of travel of the signatures, but inclined slightly downwardly with reference to the saddle, and is substantially directly in line above the apex of the saddle. The free end of the bar 218, that is the other end from that to which the supporting arm 219 is attached, extends in the direction of travel of the fingers 192 along the saddle 190, so that the signature may be slid off the bar. It will thus be seen that the opened signature when released by the opening cylinders does not drop directly upon the saddle, but upon the supporting bar 218. It is dropped upon the bar 218 an instant of time before the next succeeding pin 192 reaches it. When the pin 192 arrives, if we assume that it has one signature from a preceding opening mechanism, that signature will be registered against the pin 192 which is pushing it along the saddle 190. This pin 192 will contact with the edge of the opened signature suspended upon the bar 218. This latter signature will then be slid along the bar 218 by the pin 192, and by reason of the inclination of the bar will pass below the next succeeding bar 218 and onto the saddle 190. It will finally drop off the bar 218 completely onto the saddle and having been in registry with the pin 192 during the entire time, it will therefore be in registry with the preceding signature which was brought up by the pin 192 as hereinbefore described. It will thus be seen that all the successive signatures inset and picked up by any particular pin 192 will be in accurate register lengthwise of the page.

The manner of operation of the herein described machine will be clear to those skilled in the art from the description of the structures, and of the manner of their operation, hereinbefore given in connection with each group of mechanism. However, for convenience a brief résumé will be here given. The grippers 40 will swing inwardly, and grip the rear edge of a signature bent down by the bar 7. The fingers 80 will then lift the stack of signatures, and the grippers 40 swinging backwardly will withdraw the lower signature gripped by its back edge. The grippers 40 after reaching the limit of their swing to the right (referring to Figs. 4 and 5) will start in the opposite direction, and will push the signature forward over the table 210 and over the surface of the cylinders 111 and beneath the rolls 211, and after the signature is going accurately with the cylinder 111, the grippers will release it. The signature is directed downwardly by the fingers 212 between the cylinders 110 and 111. The suction devices on the opposed cylinders will catch the signature on the opposite sides near the front or open edge, and as the cylinders revolve they will partly open the signature. On the cessation of a suction, the open signature will drop onto the bar 218. The removal of the signature from the bar 218, in register, and the movement of the signature past successive opening mechanisms for the insetting operation will be clearly understood, as will be various other functions and operations of the machine. The cylinders 110 and 111 will slow down as the suction devices engage the signature and will speed up as they let go, thus insuring the taking of the signature by the suction devices, and causing it to drop when the suction lets go, and at the same time keeping the machine up to a high speed and thus promoting its commercial efficiency. A cushioning device for the oscillating shaft 42 is provided comprising an arm 220 fixed to said shaft. A pin 221 slides in a lug 222 upon the machine frame. Said pin has a head 223, and between said head and lug 222 is a spiral spring 224 which goes under compression when the arm 220 contacts with head 223. A counter weight 225 carried on arm 226 is also connected to said shaft 42.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A signature gathering or insetting machine for assembling folded signatures, including in combination two traveling signature opening members between which a folded signature is presented to be opened, means for holding the sides of the signature against said members as they travel and for releasing the opened signature from said members, and means for slowing the movement of said signature opening members as they take the folded signature and for speeding them up as they release the opened signature.

2. A signature gathering or insetting machine for assembling folded signatures, including in combination two traveling signature opening members between which a folded signature is presented to be opened, means for holding the sides of the signature against said members as they travel and for releasing the opened signature from said surfaces, said holding and releasing means moving apart from each other during the travel of said signature opening members, and means for slowing the movement of said signature opening members as they take the folded signature, and for speeding them up as they release the opened signature.

3. A signature gathering or insetting machine for assembling folded signatures, including in combination two traveling signature opening members between which a folded signature is presented to be opened, means for holding the sides of the signature against said members as they travel and for releasing the opened signature from said surfaces, said holding and releasing means moving apart from each other during the travel of said signature opening members, and means for varying the speed of travel of said signature opening members at the time of taking the signature and at the time of releasing the signature.

4. A signature gathering or insetting machine for assembling folded signatures, including in combination two rotary members having their axes substantially parallel between which members a folded signature is presented to be opened, means for holding the sides of the signature against said members as they travel and for releasing the opened signature from said members, and means for slowing the rotation of said members as they take the folded signature and for speeding them up as they release the signature.

5. A signature gathering or insetting machine for assembling folded signatures, including in combination two rotary members having their axes substantially parallel between which members a folded signature is presented to be opened, means for holding the sides of the signature against said members as they travel and for releasing the opened signature from said members, and means for controlling the speed of rotation of said members whereby they travel more slowly when taking the signature and more rapidly when releasing the signature.

6. A signature gathering or insetting machine for assembling folded signatures, including in combination two rotary members having their axes substantially parallel and having cylindrical surfaces arranged side by side, devices for engaging a signature at its folded edge and presenting same with its opposite edge foremost between said surfaces, means for holding the sides of said signature against said surfaces and for releasing the opened signature after partial rotation of said surfaces, and means for varying the speed of rotation of said rotary members at the time of taking the signature and at the time of releasing the signature.

7. A signature gathering or insetting machine for assembling folded signatures, including in combination two rotary members having their axes substantially parallel and having cylindrical surfaces arranged side by side, devices for engaging a signature at its folded edge and presenting same with its opposite edge foremost between said surfaces, means for holding the sides of said signature against said surfaces and for releasing the opened signature after partial rotation of said surfaces, and means for causing said members to rotate more slowly while taking the signature and more rapidly while releasing the signature.

8. A signature gathering or insetting machine for assembling folded signatures, including in combination two continuously traveling signature opening members between which a folded signature is presented to be opened, means for holding the sides of the signature against said members as they travel and for releasing the opened signature from said members, and means for slowing the movement of said signature opening members as they take the folded signature and for speeding them up as they release the opened signature.

9. A signature gathering or insetting machine for assembling folded signatures, including in combination two continuously traveling signature opening members between which a folded signature is presented to be opened, means for holding the sides of the signature against said members as they travel and for releasing the opened signature from said surfaces, said holding and releasing means moving apart from each other during the travel of said signature opening members, and means for varying the speed of travel of said signature opening members at the time of taking the signature and at the time of releasing the signature.

10. A signature gathering or insetting machine, including in combination two opposed continuously rotating cylinders located side by side and having their axes substantially parallel, said cylinders having suction orifices therein, devices for controlling the suction through said orifices, said orifices being arranged substantially longitudinally with respect to the cylinders, devices for presenting a signature between said cylinders with the edge opposite the fold foremost, and with said edge adjacent said orifices, said controlling devices causing the suction through the orifices on each cylinder to hold the contiguous side of the signature against its cylinder, and after a partial revolution to release the opened signature, and means for varying the speed of rotation of said cylinder at the time of taking the signature and at the time of releasing the signature.

11. A signature gathering or insetting machine, including in combination two opposed continuously rotating cylinders located side by side and having their axes substantially parallel, said cylinders having suction orifices therein, devices for controlling the suction through said orifices, said orifices being arranged substantially longitudinally with respect to the cylinders, devices for presenting a signature between said cylinders with the edge opposite the fold foremost, and with said edge adjacent said orifices, said controlling devices causing the suction through the orifices on each cylinder to hold the contiguous side of the signature against its cylinder, and after a partial revolution to release the opened signature, and means for causing said cylinders to rotate more slowly when taking the signature and more rapidly when releasing said signature.

12. A signature gathering or insetting machine for assembling folded signatures, including in combination two rotary signature-opening members, means for supplying signatures thereto to be opened, and means for rotating said members including a differential gear whereby the speed of the rotation of the cylinders is varied at different stages of the signature opening operation.

13. A signature gathering or insetting machine for assembling folded signatures, including in combination two opposed signature opening cylinders between which a signature is passed to be opened, means upon said cylinders for holding the signatures thereto and releasing them therefrom, means for supplying signatures to said cylinder, means for rotating said cylinders including a shaft having a gear wheel fixed thereto, a gear wheel rotating independently of said shaft, a pinion engaging one of said gear wheels, a pinion engaging the other of said gear wheels, said pinions also engaging each other, and means for oscillating said pinions in a path concentric with said shaft.

14. A signature gathering or insetting machine for assembling folded signatures, including in combination a signature holding device, two opposed rotating cylinders between which a signature passes to be opened, means upon said cylinders for holding the sides of the signature thereto and releasing them therefrom, and a swinging gripper adapted to grip a signature in said signature holder and withdraw it therefrom while swinging in one direction and for pushing the withdrawn and gripped signature into operative relation with one of said cylinders while swinging in the opposite direction, and means for causing said gripper to release the signature after it has been engaged by said cylinder.

15. A machine for assembling folded signatures, including in combination a plurality of signature-opening mechanisms arranged in series, means for conveying signatures past said opening mechanisms, said conveying means including a traveling registering device, a supporting bar arranged above and longitudinally of said conveying means in the direction of travel of the said registering device at each of said signature-opening mechanisms and adapted to receive and support the opened signature in position to be engaged by said traveling device and to be slid endwise from said support onto the conveyer and underneath the next adjacent signature support.

16. A machine for assembling folded signatures, including in combination a plurality of signature-opening mechanisms arranged in series, a support for the opened signatures, a traveling signature-engaging device coöperating with said support, a supporting member arranged above and longitudinally of said support in the direction of travel of said signature-engaging device at each of said signature-opening mechanisms, said member being adapted to receive and support the opened signature in position to be engaged by said signature-engaging device and to be slid endwise from said member onto said support.

17. A machine for assembling folded signatures, including in combination a plurality of signature-opening mechanisms arranged in series, a support for the opened signatures, and a traveling signature-engaging device coöperating therewith, a supporting bar arranged above and longitudinally of said support in the direction of travel of said signature-engaging device at each of said signature-opening mechanisms, said supporting bar being adapted to receive and support the opened signature in position to be engaged by said signature-engaging device and to be slid endwise from said bar onto said support.

18. A machine for assembling folded signatures, including in combination a plurality of signature-opening mechanisms arranged in series, a support or saddle for the opened signatures, traveling signature-engaging fingers coöperating with said support or saddle, a supporting bar arranged above and longitudinally of said support or saddle in the direction of travel of said signature-engaging fingers, said supporting bar being adapted to receive and support the opened signature in position to be engaged by a signature-engaging finger and to be slid endwise from said bar onto said support or saddle.

19. A signature gathering or insetting machine for assembling folded signatures, including in combination signature-conveying means which support the signature, said means including a traveling registering device, means for supporting an open signature within and at the back fold contiguous to said conveying means and in operative relation with said registering device, whereby the signature will be moved endwise from said support onto said conveying means in registry with said registering device.

20. A signature gathering or insetting machine for assembling folded signatures, including in combination signature-conveying means which support the signature, said means including a traveling registering device, a plurality of means each for supporting an open signature within and at the back fold and positioned along the path of travel of said registering device and in position to be engaged by said registering device, whereby the successive signatures are moved endwise from their supports onto the conveying means in register with each other.

21. A signature gathering or insetting machine for assembling folded signatures, including in combination a plurality of signature opening mechanisms arranged in series, conveying means which support and convey signatures past said opening mechanisms, said conveying means including a traveling registering device, a support at each of said opening-mechanisms for receiving a signature opened by said mechanism and supporting it within and at the back fold and in position to be engaged by said traveling registering device, whereby the successive opened signatures upon said supports are moved onto the conveying means in register with each other.

22. A signature gathering or insetting machine for assembling folded signatures, including in combination a plurality of signature opening mechanisms arranged in series means for conveying opened signatures past said opening mechanisms, said conveying means including a traveling registering device, a support arranged longitudinally of said conveying means at each of said signature-opening mechanisms and adapted to receive the open signature and support it in position to be engaged by said traveling registering device.

23. A signature gathering or insetting machine for assembling folded signatures, including in combination a plurality of signature-opening mechanisms arranged in series, means for conveying signatures past said opening mechanisms, said conveying means including a traveling registering device, a supporting bar arranged above and longitudinally of said conveying means and slightly inclined in the direction of travel of said registering device at each of said signature opening mechanisms and adapted to receive and support the open signature in position to be engaged by said traveling registering device and to be slid endwise from said support onto the conveyer and underneath the next adjacent signature support.

24. A signature gathering or insetting machine for assembling folded signatures including in combination a plurality of signature-opening mechanisms each mechanism including two opposed signature-opening cylinders between which a folded signature passes to be opened, means for holding the sides of the signature to said cylinders and releasing them therefrom after a partial rotation, a support located between each pair of said cylinders and below their central line for receiving the open signature therefrom, conveying means extending past the series of signature opening mechanisms, said conveying means including a traveling registering device which engages each successive open signature upon its support and slides it onto the conveying means, whereby the successive signatures may be inset and registered with each other.

25. A signature gathering or insetting machine for assembling folded signatures, including in combination a plurality of signature opening mechanisms said opening mechanisms comprising pairs of opposed cylinders between which folded signatures are passed to be opened, said cylinders having pneumatic suction means, a stationary suction-controlling plate at an end of each of said cylinders, the corresponding cylinders of adjacent pairs having their controlling plates toward each other and common spring means between said plates to press each into air tight contact with its own cylinder.

In testimony whereof, I have signed my name to this specification, in the presence of two subscribing witnesses.

CHARLES GITZENDANNER.

Witnesses:
JOHN D. MORGAN,
ROSE MENK.